United States Patent

Fukada

[11] Patent Number: 6,131,688
[45] Date of Patent: Oct. 17, 2000

[54] DRIFTOUT CONTROL DEVICE OF FOUR WHEEL STEERED VEHICLE BY COMBINATION OF BRAKE/TRACTION CONTROL AND REAR WHEEL STEERING

[75] Inventor: Yoshiki Fukada, Susono, Japan

[73] Assignee: Toyota Jidosha Kabushiki Kaisha, Toyota, Japan

[21] Appl. No.: 09/012,429

[22] Filed: Jan. 23, 1998

[30] Foreign Application Priority Data

Mar. 4, 1997 [JP] Japan ................................ 9-065455

[51] Int. Cl.[7] ............................................ B62D 5/06
[52] U.S. Cl. ....................... 180/408; 180/197; 701/41; 303/140
[58] Field of Search ................................ 180/408, 412, 180/413, 415, 197; 701/41, 42; 303/140, 146

[56] References Cited

U.S. PATENT DOCUMENTS

| 4,998,593 | 3/1991 | Karnopp et al. ................ 180/408 |
| 5,089,967 | 2/1992 | Haseda et al. ................ 364/426.02 |
| 5,238,078 | 8/1993 | Harada ................ 180/140 |
| 5,303,989 | 4/1994 | Yasuno et al. ................ 303/111 |
| 5,316,098 | 5/1994 | Akita et al. ................ 180/140 |
| 5,316,379 | 5/1994 | Becker et al. ................ 303/100 |
| 5,341,296 | 8/1994 | Yasuno et al. ................ 364/426.01 |
| 5,428,532 | 6/1995 | Yasuno ................ 364/424.05 |
| 5,457,632 | 10/1995 | Tagawa et al. ................ 364/424.05 |
| 5,686,662 | 11/1997 | Tracht et al. ................ 73/121 |
| 5,704,695 | 1/1998 | Monzaki et al. ................ 303/146 |
| 5,704,696 | 1/1998 | Monzaki ................ 303/146 |
| 5,816,669 | 10/1998 | Hiwatashi et al. ................ 303/140 |
| 5,839,799 | 11/1998 | Fukada ................ 303/146 |
| 5,864,769 | 1/1999 | Inagaki et al. ................ 701/70 |
| 5,882,092 | 3/1999 | Koibuchi ................ 303/146 |

FOREIGN PATENT DOCUMENTS

| 4-81351 | 3/1992 | Japan . |
| 4081351 | 3/1992 | Japan . |
| 05294249 | 11/1993 | Japan . |

*Primary Examiner*—Paul N. Dickson
*Assistant Examiner*—Daniel Yeagley
*Attorney, Agent, or Firm*—Oliff & Berridge, PLC

[57] ABSTRACT

A driftout control device of a four wheel steered vehicle has a brake/traction system for selectively applying a braking or a traction force to each of the four wheels, and a steering system for selectively steering a pair of front and a pair of rear wheels separately, wherein the driftout control device includes a first controller for controlling the brake/traction system so as selectively to generate a turn assist yaw moment in the vehicle, and a second controller for controlling the steering system so as selectively to steer the pair of rear wheels in a same steering direction as a steering of the pair of front wheels for a turn running of the vehicle when the first controller is controlling the brake/traction system for generation of the turn assist yaw moment, so that an anti-turn yaw moment generated by the rear wheels steered in the same direction as the front wheels is canceled by an increased generation of the turn assist yaw moment, while ensuring a larger centripetal side force at the rear wheels to suppress the driftout.

8 Claims, 11 Drawing Sheets

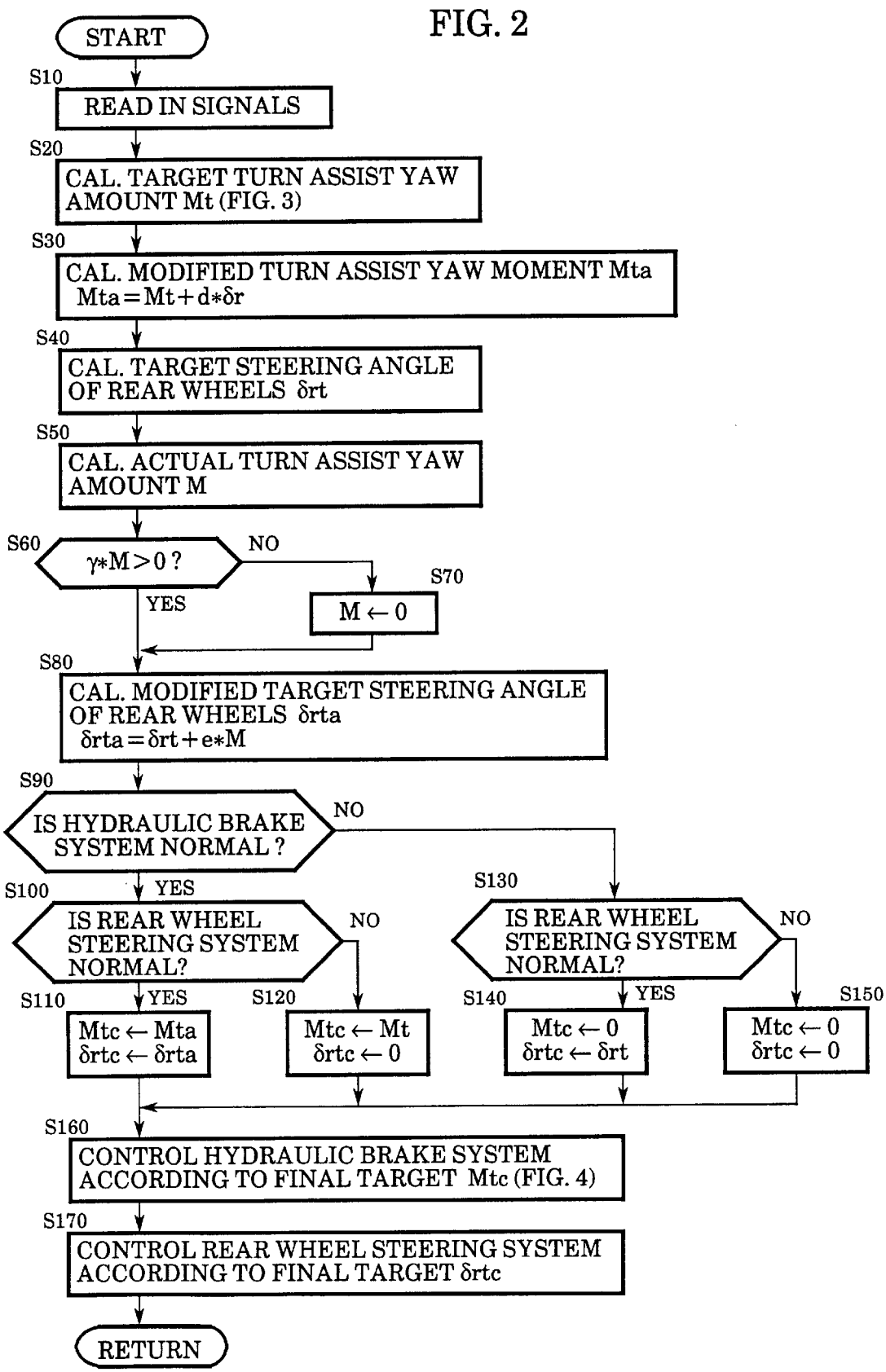

FIG. 3

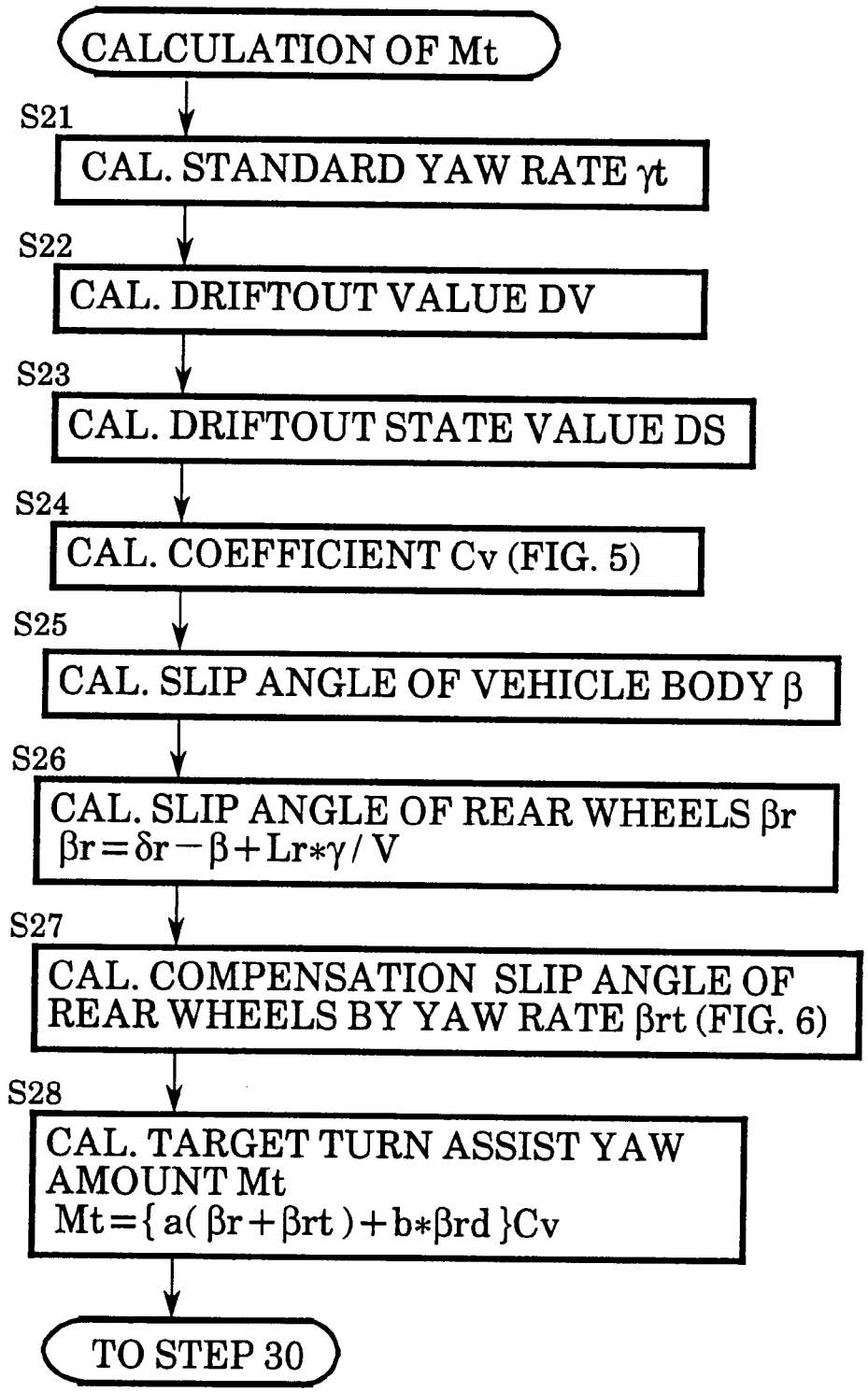

- CALCULATION OF Mt
- S21: CAL. STANDARD YAW RATE $\gamma t$
- S22: CAL. DRIFTOUT VALUE DV
- S23: CAL. DRIFTOUT STATE VALUE DS
- S24: CAL. COEFFICIENT Cv (FIG. 5)
- S25: CAL. SLIP ANGLE OF VEHICLE BODY $\beta$
- S26: CAL. SLIP ANGLE OF REAR WHEELS $\beta r$
  $\beta r = \delta r - \beta + Lr * \gamma / V$
- S27: CAL. COMPENSATION SLIP ANGLE OF REAR WHEELS BY YAW RATE $\beta rt$ (FIG. 6)
- S28: CAL. TARGET TURN ASSIST YAW AMOUNT Mt
  $Mt = \{a(\beta r + \beta rt) + b * \beta rd\} Cv$
- TO STEP 30

DRIFTOUT CONTROL DEVICE OF FOUR WHEEL STEERED VEHICLE BY COMBINATION OF BRAKE/TRACTION CONTROL AND REAR WHEEL STEERING

BACKGROUND OF THE INVENTION

1. Field of the Invention

The present invention relates to a turn behavior control of vehicles, and more particularly, to a driftout control of vehicles.

2. Description of the Prior Art

As a turn behavior control of vehicles, it is known to control the driftout of a vehicle by applying an unbalanced braking force or a traction force to some selected wheel or wheels of the vehicle, so as thereby to generate a yaw moment in the vehicle around the center of gravity thereof in the direction of assisting the turning of the vehicle. On the other hand, in the case of a four wheel steered vehicle, it is known that a sharp turn with no driftout is available by the rear wheels being steered in a direction opposite to that in which the front wheels are steered. The above two principles of controlling the driftout of vehicles can be combined when the vehicle is a four wheel steered vehicle. Indeed, it is proposed in Japanese Patent Laid-open Publication 4-81351 to control the driftout of a four wheel steered vehicle by a combination of a brake control and a rear wheel steering, wherein the rear wheels are steered in a direction opposite to that in which the front wheels are steered when the brake system is operated to generate a turn assist yaw moment in the vehicle for suppressing the driftout of the vehicle.

However, the essential problem residing in the driftout of the vehicle is that the wheels of the vehicle can no longer generate a centripetal side force required to support the centrifugal force acting at the vehicle during a turn by the frictional contact thereof with the road surface under the given conditions with regard to the slip angle and the vertical load.

SUMMARY OF THE INVENTION

In view of the above, it is a primary object of the presetent invention to provide an improved driftout control device of a four wheel steered vehicle which ensures a more desirable driftout suppress performance based upon the fundamental recognition of the principle of the driftout in the vehicle.

According to the present invention, the above-mentioned primary object is accomplished by a driftout control device of a four wheel steered vehicle having a pair of front and a pair of rear wheels, a brake/traction system for selectively applying a braking and/or a traction force to each of the four wheels, and a steering system for selectively steering the pair of front and the pair of rear wheels separately, the driftout control device comprising a first control means for controlling the brake/traction system so as selectively to generate a turn assist yaw moment in the vehicle, and a second control means for controlling the steering system so as selectively to steer the pair of rear wheels in a same steering direction as a steering of the pair of front wheels for a turn running of the vehicle when the first control means controls the brake/traction system for generation of the turn assist yaw moment.

When four wheeled front steered road vehicles are making a turn along a curved course, the slip angles of the four wheels are generally as diagrammatically shown in FIG. 12., wherein front left and front right wheels 100FL and 100FR of a vehicle 102 show a relatively large slip angle $\beta f$, while rear left and rear right wheels 100RL and 100RR show only a small slip angle $\beta r$, so that the side force Ff of the front wheels is in an already saturated descending phase against a further increase of the slip angle as shown in FIG. 13, while the side force Fr of the rear wheels can still increase if the slip angle is increased. Therefore, it is contemplated that a still more large side force is available if the slip angle of the rear wheels is increased when it is possible as in the four wheel steered vehicles. However, if the slip angle of the rear wheels is increased by the rear wheels being steered in the same direction as the front wheels during a turn of the vehicle piloted by the front wheels, the increased side force at the rear wheels generates a yaw moment around the center of gravity 104 of the vehicle in the direction opposite to the turn of the vehicle, acting against suppressing the driftout of the vehicle. However, it is still contemplated that such an anti-turn yaw moment can be compensated for or canceled by correspondingly increasing the generation of the turn assist yaw moment by the brake/traction system.

In the above-mentioned driftout control device, the first control means may control the brake/traction system so as to generate the turn assist yaw moment substantially as a sum of a first amount and a second amount, the second amount being substantially proportional to angle of steering of the rear wheels in the same direction as the steering of the front wheels.

Further, in such a driftout control device, the first control means may control the brake/traction system so as to generate the turn assist yaw moment such that the first amount thereof is a sum of a third amount substantially proportional to slip angle of the rear wheels, a fourth amount substantially proportional to a function of yaw rate of the vehicle and a fifth amount substantially proportional to differential of the slip angle of the rear wheels in the same direction as the steering of the front wheels, the function being substantially proportional to the yaw rate.

Further, in such a driftout control device, the first control means may control the brake/traction system so as to generate the turn assist yaw moment such that the first amount is increased substantially proportionally according to increase of driftout of the vehicle when the driftout increases beyond a predetermined value.

Further, in the driftout control device of the above-mentioned basic construction, the second control means may control the steering system so as to steer the rear wheels in the same direction as the steering of the front wheels with an additional increase thereof, the additional increase being substantially proportional to an actual turn assist yaw moment generated by the brake/traction system in the vehicle.

In this case, the second control means may control the steering system so as to steer the rear wheels such that the additional increase is made zero when the actual turn assist yaw moment is opposite to yaw rate of the vehicle in the direction thereof.

When the driftout control is so constructed that the first control means controls the brake/traction system so as to generate the turn assist yaw moment substantially as a sum of a first amount and a second amount, the second amount being substantially proportional to angle of steering of the rear wheels in the same direction as the steering of the front wheels, the driftout control device may be so modified that the first control means controls the brake/traction system so as to generate the turn assist yaw moment by canceling the second amount, while the second control means cancels to control the steering system, when the steering system is not normally operating.

When the driftout control device is so constructed that the second control means controls the steering system so as to steer the rear wheels in the same direction as the steering of the front wheels with an additional increase thereof, the additional increase being substantially proportional to an actual turn assist yaw moment generated in the vehicle, the driftout control device may be so modified that the first control means cancels to control the brake/traction system, while the second control means controls the steering system so as to steer the rear wheels in the same direction as the steering of the front wheels by canceling the additional increase, when the brake/traction system is not normally operating.

BRIEF DESCRIPTION OF THE DRAWING

In the accompanying drawing,

FIG. 2 is a flowchart showing an embodiment of the driftout control device according to the present invention in the form of the operation thereof;

FIG. 3 is a sub-flowchart showing a further detail of the operation in step 20 of FIG. 2;

DESCRIPTION OF THE PREFERRED EMBODIMENTS

In the following, the present invention will be described in more detail in the form of some preferred embodiments thereof with reference to the accompanying drawings.

Figure 1:
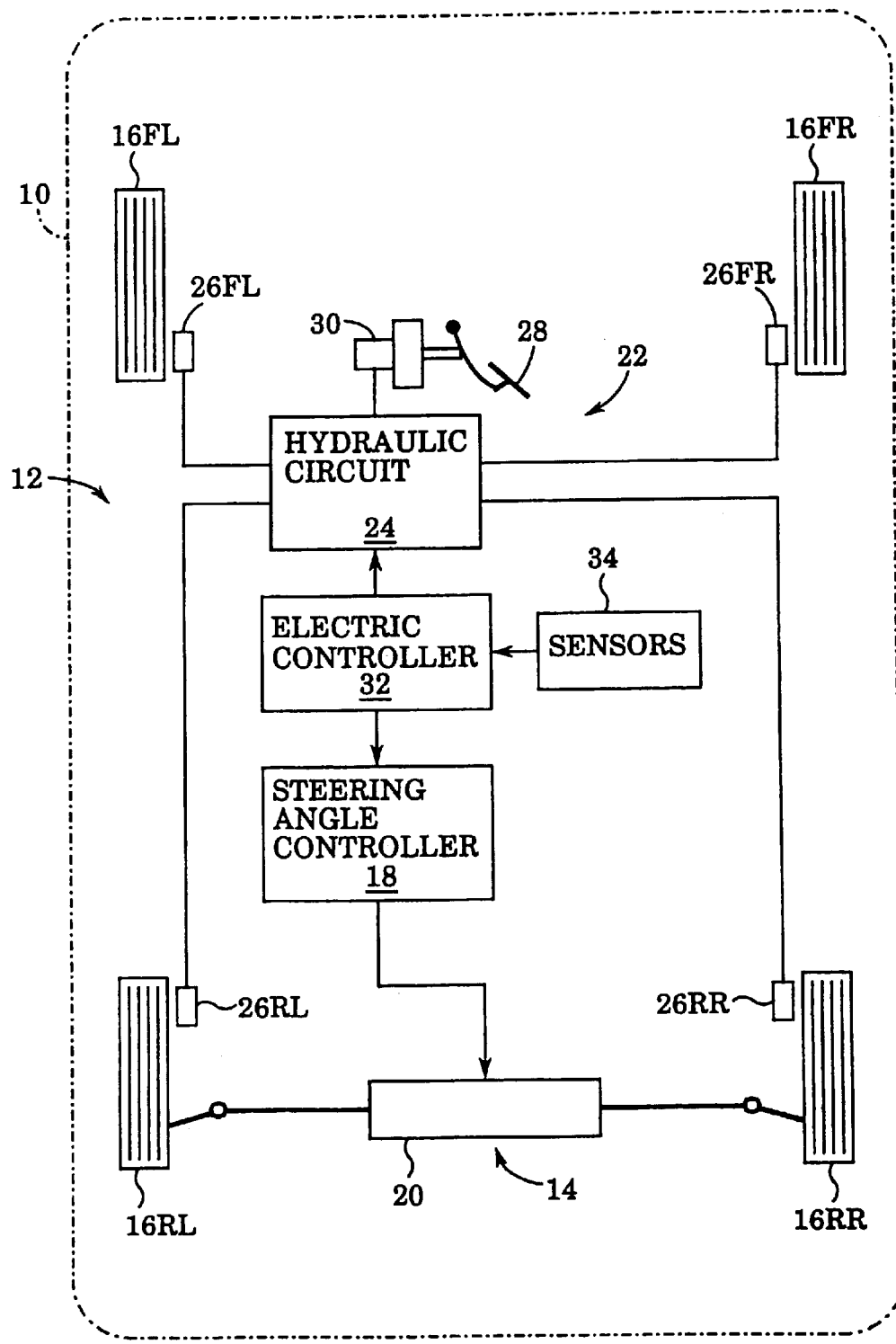
FIG. 1 is a diagrammatical plan view of a four wheel steered vehicle incorporating the driftout control device according to the present invention.

Referring to FIG. 1, 10 designates a four wheel steered vehicle in which a driftout control device 12 according to the present invention is incorporated. The vehicle 10 has four wheels (a pair of front wheels 16FL and 16FR and a pair of rear wheels 16RL and 16RR), a steering system including a front wheel steering system (not shown) and a rear wheel steering system 14 (the rear wheel steering system 14 including a steering angle controller 18 and a steering angle actuator 20), and a hydraulic brake system 22 including a hydraulic circuit 24, wheels cylinders 26FL, 26FR, 26RL and 26RR for the wheels 16FL, 16FR, 16RL and 16RR, respectively, a brake pedal 28 adapted to be selectively depressed by a driver, and a master cylinder 30. The driftout control device 12 according to the present invention is essentially composed of an electric controller 32 and sensors 34 for supplying various signals to the electric controller 32, but in a broader sense the driftout control device 12 according to the present invention includes also the rear wheel steering system 14 and the hydraulic brake system 22 adapted to be controlled by the electric controller 32 for the purpose of suppressing the driftout of the vehicle 10. In this connection, although the present invention is described in detail hereinbelow with respect to the above-mentioned vehicle 10 in which the turn assist yaw moment is generated by the brake system, it will be apparent for those skilled in the art that a traction control may be combined into the brake control to generate a required turn assist yaw moment. Therefore, in the present description the term "brake/traction" system is used to show the brake based turn assist yaw moment generation system which may optionally incorporate a traction system for generating the turn assist yaw moment.

The steering angle controller 18 and the steering angle actuator 20 may each be of a conventional type. The hydraulic circuit 24 may also be of a conventional type, and, although not shown in FIG. 1, it includes a reservoir, a pump and various valves. The brake pressure in each of the wheel cylinders 26FL, 26FR, 26RL and 26RR is normally controlled by the hydraulic circuit 24 in response to the depression of a brake pedal 28 through the master cylinder 30, and is also controlled by the hydraulic circuit 24 under the control of the electric controller 32 for execution of a behavior control, generally a turn stability control, and particularly for execution of the driftout control according to the present invention.

Although not shown in FIG. 1, the electric controller 32 may be made of a micro-computer of a conventional construction, including such elements as central processing unit (CPU), read only memory (ROM), random access memory (RAM), input and output port means and a bilateral common bus interconnecting these elements.

The sensors collectively designated by 34 include a yaw rate sensor which generates a signal representing yaw rate $\gamma$ of the vehicle, a vehicle speed sensor which generates a signal representing vehicle speed V, a lateral acceleration sensor which generates a signal representing lateral acceleration Gy of the vehicle, a pair of steering angle sensors which generate signals representing steering angle $\delta f$ of the front wheels and steering angle $\delta r$ of the rear wheels, a set of wheel speed sensors which generate signals representing wheel speeds Vwi (i=fl, fr, rl, rr) of the four wheels, and a set of pressure sensors which generate signals representing brake pressures Pbi (i=fl, fr, rl, rr) at the four wheels. The signals about the yaw rate and the lateral acceleration are made positive when the vehicle is making a left turn. The signal about the steering angle is made positive with respect to both of the front and rear wheels when it is oriented leftward relative to the longitudinal axis of the vehicle body.

The electric controller 32 carries out various calculations based upon the parameters detected by the above-mentioned sensors 34, estimates a driftout state of the vehicle, and operates the hydraulic circuit 24 so as to provide the vehicle with a turn assist moment by controlling the brake forces of the respective wheels, while operating the rear wheel steering system 14 so as to steer the rear wheels in the same direction as the steering direction of the front wheels.

In the following, the operation of the driftout control device of the present invention is described in detail with reference to FIGS. 2–4. The control according to the flowchart of FIG. 2 is started upon closure of an ignition switch (not shown) of the vehicle and is repeated at a predetermined cycle time as long as the ignition switch is kept closed.

Referring first to FIG. 2, in step 10 the signals are read in from the sensors described above. Then in step 20, a target turn assist yaw moment Mt is calculated according to a routine described in detail hereinbelow with reference to FIG. 3.

Then in step 30, the target turn assist yaw moment Mt is modified to Mta according to the steering angle δr of the rear wheels, by taking an appropriate positive constant d, as follows:

$$Mta = Mt + d*\delta r \quad (1)$$

This means that the target value of the turn assist yaw moment to be generated by the hydraulic brake system is increased by an additional amount $d*\delta r$ proportional to the value of the rear steering angle δr to compensate for the anti-turn yaw moment generated by the steering of the rear wheels in the same direction as the front wheels.

In step 40, a target steering angle δrt for the rear wheels is calculated based upon the yaw rate γ and the steering angle δf of the front wheels, by taking appropriate positive constants c1 and c2, as follows:

$$\delta rt = c1*\gamma - c2*\delta f \quad (2)$$

As will be noted, the constant c1 represents the degree of desirability of the rear wheel steering in the same direction as the front wheels being increased along with increase of the yaw rate of the vehicle, while the constant c2 represents the degree of desirability of not canceling the steering function of the front wheels by the steering of the rear wheels in the same direction.

In step 50, a parameter M representing the actual turn assist yaw amount currently generated by the brake system is calculated based upon the current actual brake pressures Pbi of the respective wheels, as follow:

$$M = Pbfl - Pbfr + Pbrl - Pbrr \quad (3)$$

In step 60, it is judged if the product of the yaw rate γ and the actual turn assist yaw amount M is positive, i.e. if the turn assist yaw amount M is properly generated at least with regard to the direction thereof. If the answer is yes, the control proceeds directly to step 80, while if the answer is no, the control proceeds to step 70, where the parameter M is made zero, and then the control proceeds to step 80.

In step 80, the target steering angle δrt of the rear wheel is modified according to the parameter M, by taking an appropriate positive constant e, to produce a modified target steering angle δrta for the rear wheels as follows:

$$\delta rta = \delta rt + e*M \quad (4)$$

This modification is entered to seek a possibly larger value of the rear wheel steering angle in the same direction as the steering of the front wheels, allowable according to increase of the turn assist yaw moment, so that a possibly larger centripetal force is available at the rear wheels without undesirably affecting the steerability of the vehicle.

In step 90, it is judged if the hydraulic brake system 22 is normally operating for executing the behavior control of the vehicle. Such a judgment may be made according to any convenient method by utilizing a conventional means. If the answer is yes, the control proceeds to step 100, while if the answer is no, the control proceeds to step 130.

In step 100, it is judged if the rear wheel steering system 14 is normally operating. Such a judgment may also be made according to any convenient method by utilizing a conventional means. If the answer is yes, the control proceeds to step 110, where the modified target turn assist yaw moment Mta is made a final target turn assist yaw moment Mtc, while the modified target rear wheel steering angle δrta is made a final target rear wheel steering angle δrtc. If the answer of step 100 is no, the control proceeds to step 120, where the final target turn assist yaw moment Mtc is made to Mt to exclude any erroneous influence of the rear wheel steering system from being incorporated into the control, while the final target rear wheel steering angle δrtc is made zero for the same reason.

In step 130, it is judged if the rear wheel steering system 14 is normally operating in the same manner as in step 100. If the answer is yes, the control proceeds to step 140, where the final turn assist yaw moment Mtc is made zero for a similar reason of excluding any erroneous influence of the hydraulic brake system from being incorporated into the control, while the final target rear wheel steering angle δrtc is made δrt not modified by M for the same reason. If the answer of step 130 is no, the control proceeds to step 150, where the final target turn assist yaw moment Mtc and the final target rear wheel steering angle δrtc are both made zero for the same reason.

However, the judgment in step 90 with regard to whether the hydraulic brake system is normally operating or not, and the judgments in steps 100 and 130 with regard to whether the rear wheel steering means 14 is normally operating or not are not essential for the gist of the present invention. Therefore, these steps may be omitted.

In step 160, a hydraulic brake system control is executed according to the routine shown in FIG. 4 as described in detail hereinbelow, by using the final turn assist yaw moment Mtc. Then in step 170, a rear wheel steering control is executed by using the final target rear wheel steering angle δrtc.

FIG. 3 shows the details of the target turn assist yaw moment calculation step 20 of FIG. 2. According to this routine, in step 21 a primary standard yaw rate γc is calculated based upon the vehicle speed V, front wheel steering angle δf and wheel base H, by taking an appropriate stability factor Kh, and then the primary standard yaw rate γc is time-progressively modified by a time constant T and the Laplace operator s to a final standard yaw rate γt, as follows:

$$\gamma c = V*\delta f/(1 + Kh*V^2)*H \quad (5)$$

$$\gamma t = \gamma c/(1 + T*s) \quad (6)$$

The standard yaw rate γt may be further modified by the lateral acceleration Gy of the vehicle so that the dynamism of the yaw rate is reflected thereon.

In step 22, a driftout value DV is calculated as follows:

$$DV = (\gamma t - \gamma) \quad (7)$$

or $$DV = H^*(\gamma t - \gamma)/V \quad (8)$$

In step 23, the turning direction of the vehicle is judged based upon the sign of the yaw rate γ detected by the yaw rate sensor, and if the vehicle is making a left turn, a driftout state value DS is defined as DV, while if the vehicle is making a right turn, the driftout state value DS is defined as −DV. When the value of DS was calculated as a negative value, the driftout state value DS is made zero.

Figure 5:
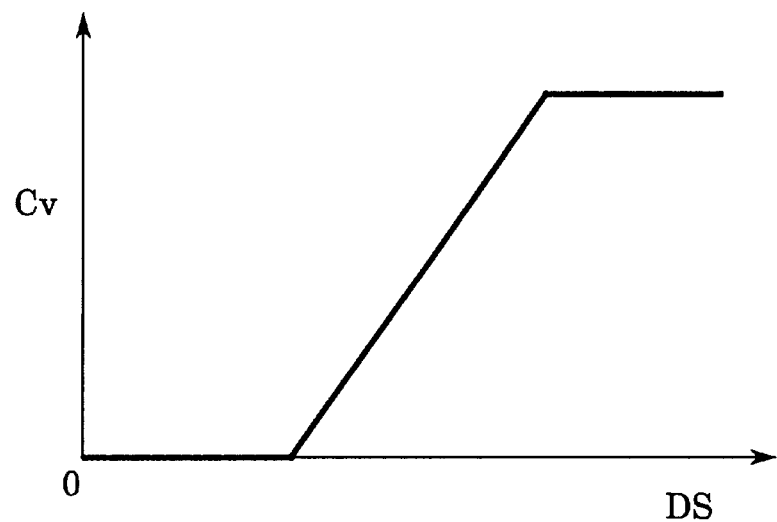
FIG. 5 is a map showing an example of determining coefficient Cv according to driftout state value DS.

In step 24, based upon the driftout state value DS, a coefficient Cv is determined by referring to a map such as shown in FIG. 5. The coefficient Cv is a value which finally proportionally modifies the target turn assist yaw moment Mt according to the driftout condition of the vehicle, as described in step 28.

In step 25, differential of the lateral acceleration is calculated as a difference Gy−V*γ, and by integrating the differential on time basis, a side slide velocity Vy of the vehicle is calculated. Then, the slip angle β of the vehicle body is calculated as a ratio of the side slide velocity Vy to the longitudinal velocity Vx of the vehicle (=vehicle speed V), as β=Vy/Vx.

In step 26, the slip angle βr of the rear wheels is calculated based upon the rear wheel steering angle δr, the vehicle body slip angle β, the yaw rate γ, the vehicle speed V and the distance Lr between the center of gravity of the vehicle and the rear wheel axle, as follows:

$$\beta r = \delta r - \beta + Lr^* \gamma / V \quad (9)$$

Figure 6:
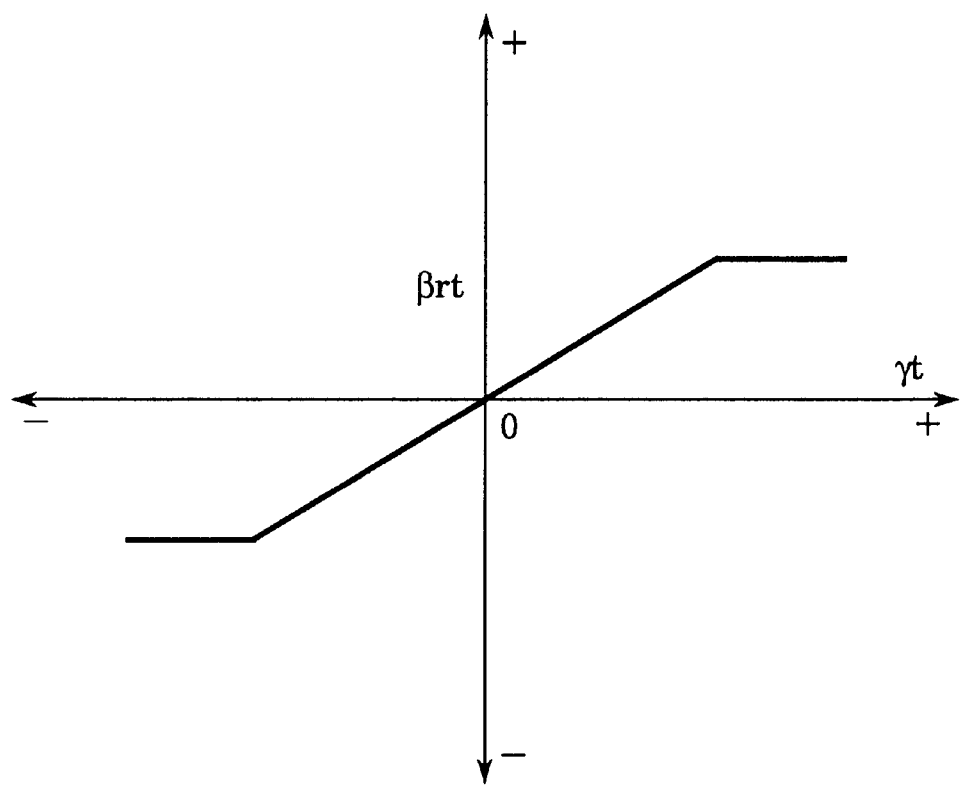
FIG. 6 is a map showing an example of determining compensation slip angle $\beta rt$ of the rear wheels by yaw rate $\gamma t$.

In step 27, a compensation slip angle βrt of the rear wheels by the yaw rate is determined by referring to a map such as shown in FIG. 6. As will be noted in the next step, the compensation slip angle βrt represents an amount of feed forward compensation for an increase of the centrifugal force generated in the vehicle due to the application of the turn assist yaw moment. In the example shown in FIG. 6, the compensation is estimated to be proportional to the value of the yaw rate.

In step 28, by taking an appropriate positive proportioning constant a for the sum of βr and βrt and an appropriate proportioning constant b for differential βrd of βr, the target value Mt for the turn assist yaw moment is calculated as follows:

$$Mt = \{a(\beta r - \beta rt) + b^* \beta rd\} Cv \quad (10)$$

Figure 4:
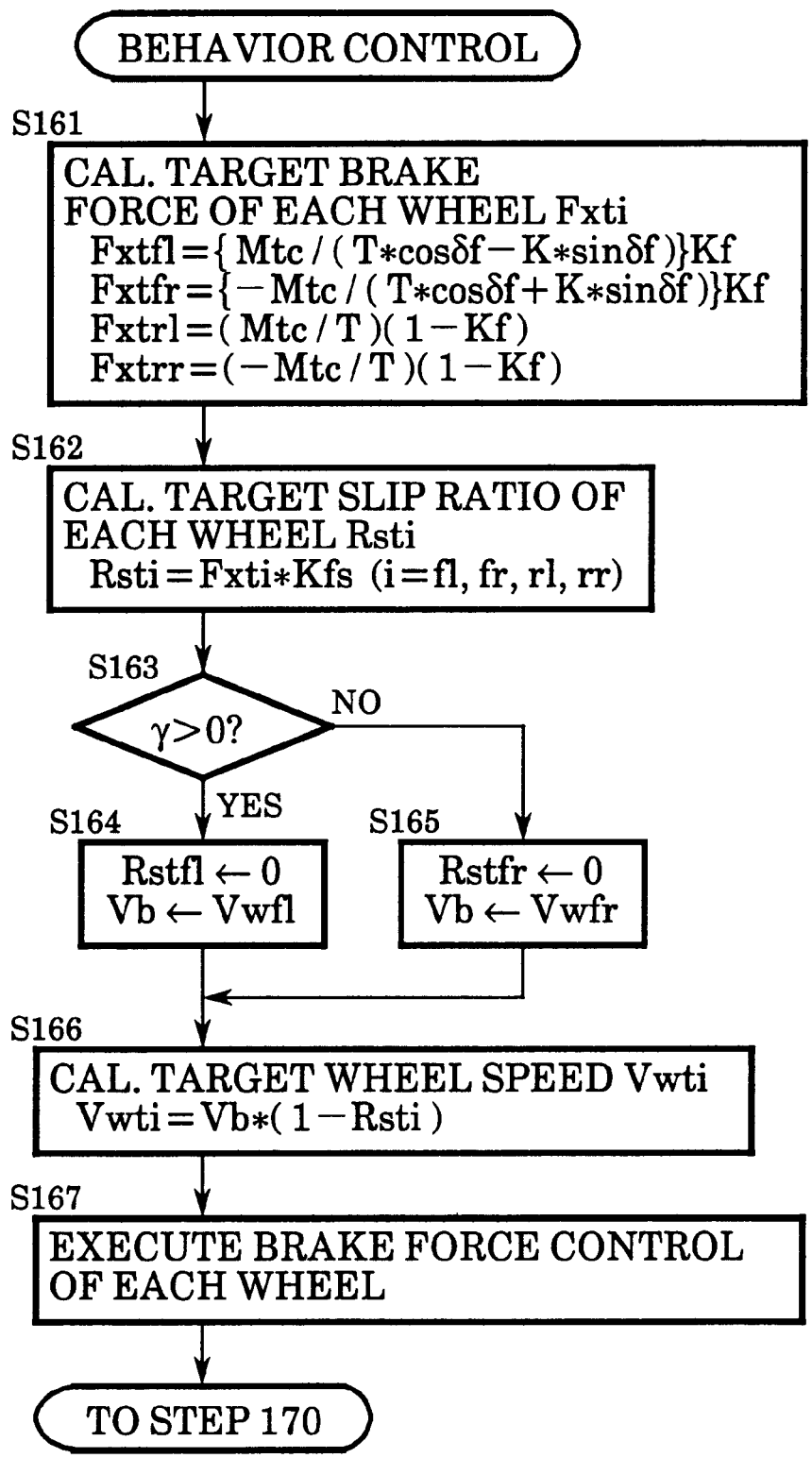
FIG. 4 is a sub-flowchart showing a further detail of the operation in step 160 of FIG. 2.

FIG. 4 shows the details of step 160. According to this routine, in step 161, taking T as the tread, K as an appropriate proportioning constant and Kf (0<Kf<1) as a share ratio of the brake force for the front wheels, target brake forces Fxti (i=fl, fr, rl, rr) for the front left, front right, rear left and rear right wheels are calculated as follows:

$$Fxtfl = \{Mtc/(T^* \cos \delta f - K^* \sin \delta f)\} Kf$$

$$Fxtfr = \{-Mtc/(T^* \cos \delta f + K^* \sin \delta f)\} Kf$$

$$Fxtrl = (Mtc/T)(1 - Kf)$$

$$Fxtrr = (-Mtc/T)(1 - Kf) \quad (11)$$

In step 162, taking Kfs as a force-to-slip ratio conversion constant, the target slip ratios Rsti (i=fl, fr, rl, rr) of the respective wheels are calculated as follows:

$$Rsti = Fxti^* Kfs \quad (12)$$

In step 163, it is judged if the yaw rate γ is positive, i.e. if the vehicle is making a left turn. If the answer is yes, then in step 164 the target slip ratio Rstfl of the front left wheel is set to zero and the standard wheel speed Vb for use in step 166 is set to be the wheel speed of the front left wheel, i.e. Vwfl. If the answer of step 163 is no, then in step 165 the target slip ratio Rstfr of the front right wheel is set to zero and the standard wheel speed Vb is set to be the wheel speed of the front right wheel, i.e. Vwfr.

In step 166, the target wheel speeds Vwti (i=fl, fr, rl, rr) for the respective wheels are calculated as follows:

$$Vwti = Vb^*(1 - Rsti) \quad (13)$$

In step 167, the brake control is executed to apply a controlled brake force to each selected wheel, so that the wheel speed of each wheel is controlled to the target wheel speed Vwti.

In the following, the improvement of the turning performance of the vehicle obtained by the present invention is described in comparison with those of the conventional vehicles with reference to FIGS. 7A, 7B–11.

Figure 7A:
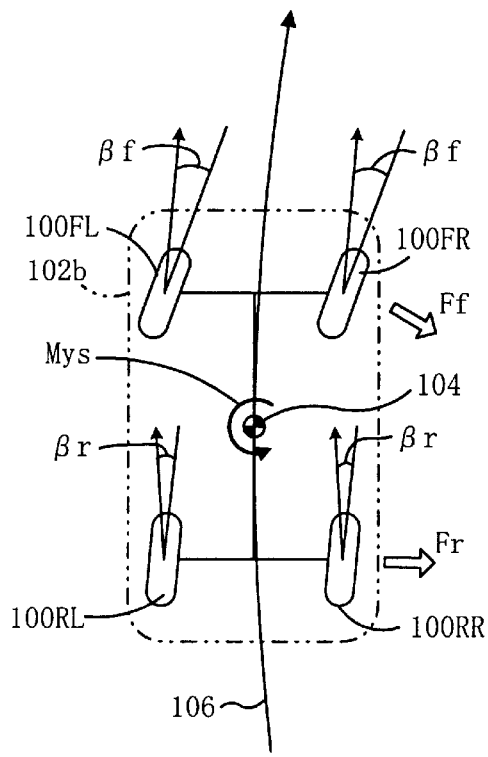
FIGS. 7A and 7B are diagrammatical plan views showing a four wheel steered vehicle in an early and a later stage of a right turn, respectively, wherein the rear wheels are steered in the same direction as the front wheels, with no brake/traction control for a turn performance control.
Figure 7B:
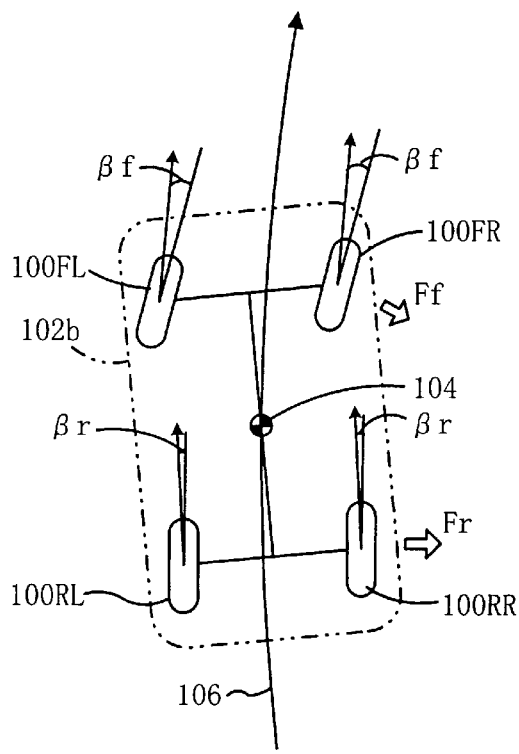

FIGS. 7A and 7B show a case where a vehicle 102b makes a right turn with the rear wheels 100RL and 100RR being steered in the same direction as the front wheels 100FL and 100FR, with no turn assist control being effected by the brake/traction control. In this case, as shown in FIG. 7A, in an early stage of the turn, a relatively large rear wheel slip angle βr in the same direction as a front wheel slip angle βf generates a relatively large centripetal side force Fr, together with a relatively large centripetal side force Ff by the front wheels. However, since the side force Fr at the rear wheels generates a yaw moment Mys around the center of gravity 104 of the vehicle which opposes the steered turn of the vehicle, in a later stage of the turn, as shown in FIG. 7B, the vehicle is rotated around the center of gravity 104 in the counter-clockwise direction relative to the direction of progress of the vehicle, so as undesirably to decrease the slip angle of the vehicle body, thereby causing a total decrease of the slip angles of the four wheels, thereby causing a loss of steerability of the vehicle. As a result, as shown by trace B in FIG. 11, the vehicle shows a substantial understeer performance as compared even with trace A by an ordinary vehicle 102a having no rear wheel steering system and no brake/traction turn stability control system. In other words, the vehicle 102b shows a much larger driftout than the trace A of the ordinary vehicle 102a which shows a certain drift out. Further, it will be noted that the trace B is undesirably biased to the inside of the turn in the early stage of the turn.

Figure 8A:
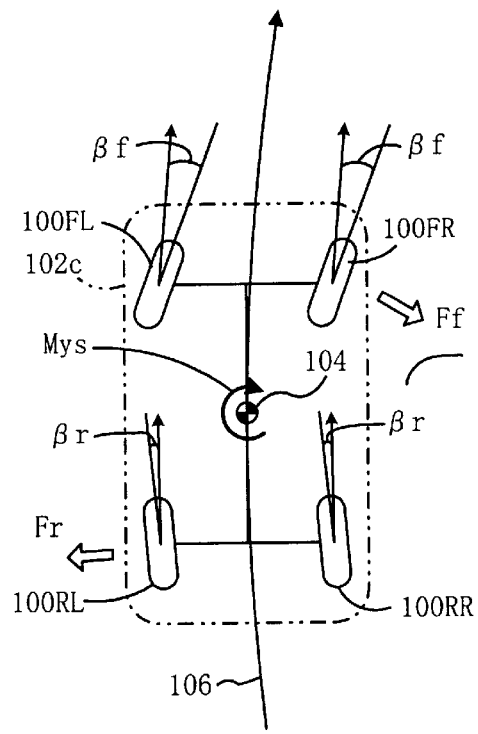
FIGS. 8A and 8B are diagrammatical plan views showing a four wheel steered vehicle in an early and a later stage of a right turn, respectively, wherein the rear wheels are steered in the direction opposite to that of the front wheels, with no brake/traction control for a turn performance control.
Figure 8B:
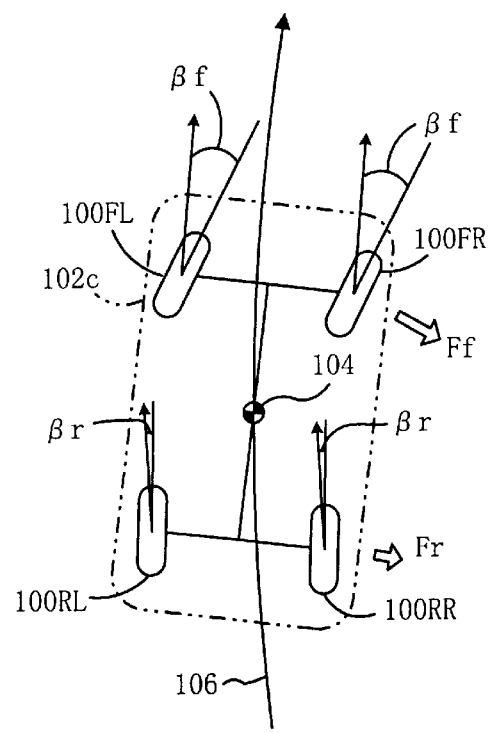
Figure 11:
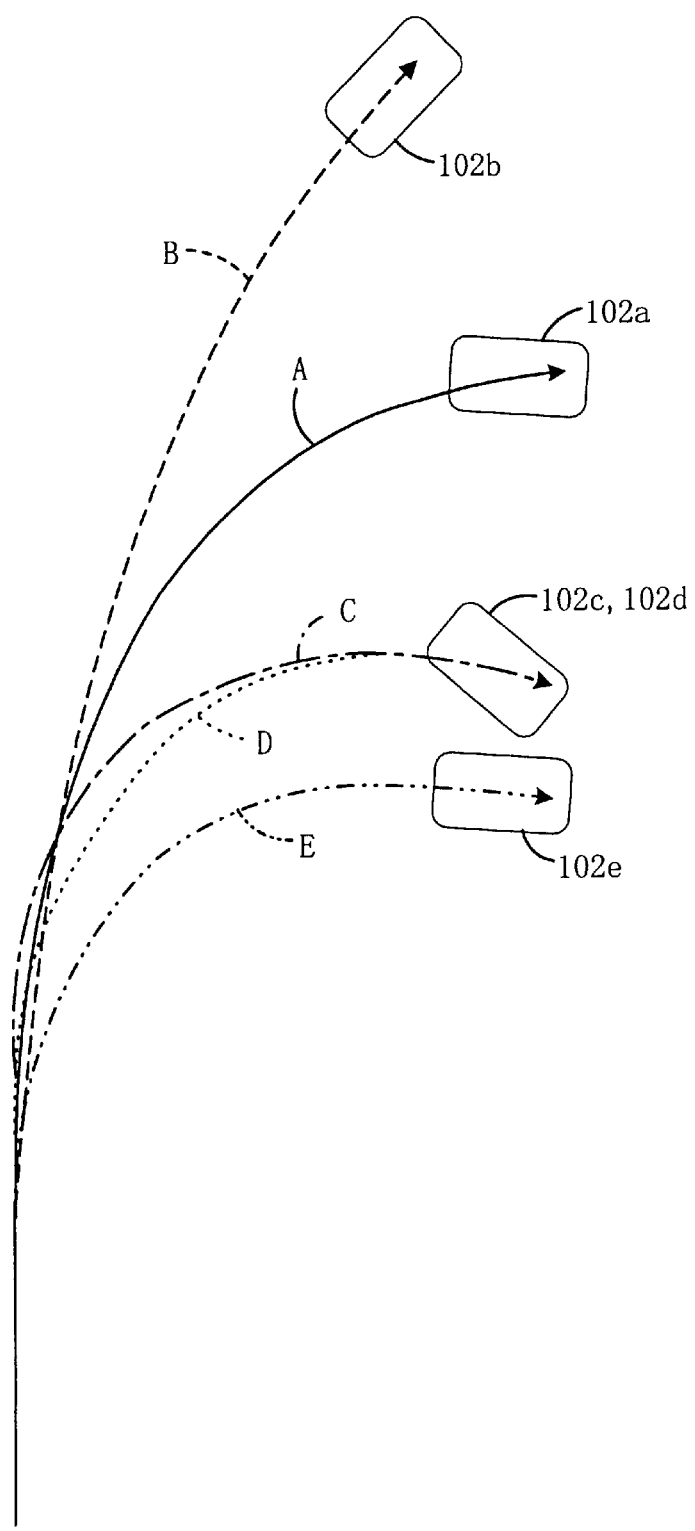
FIG. 11 is a plan view showing the traces of turn running drawn by the vehicles of FIGS. 7A, 7B, 8A, 8B, 9A, 9B and 10A, 10B in comparison with one another and with an ordinary vehicle (trace A) applied with no rear wheel steering or no brake/traction control.
Figure 12:
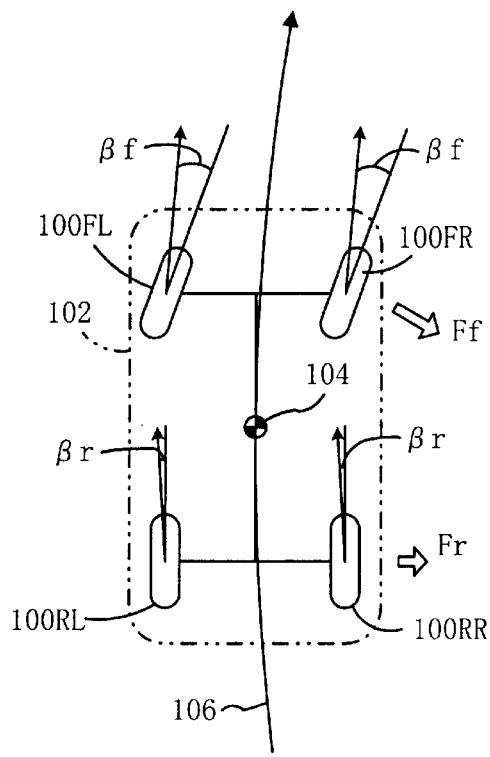
FIG. 12 is a diagrammatical plan view of a four wheel vehicle for an analysis of the slip angles of the four wheels.
Figure 13:
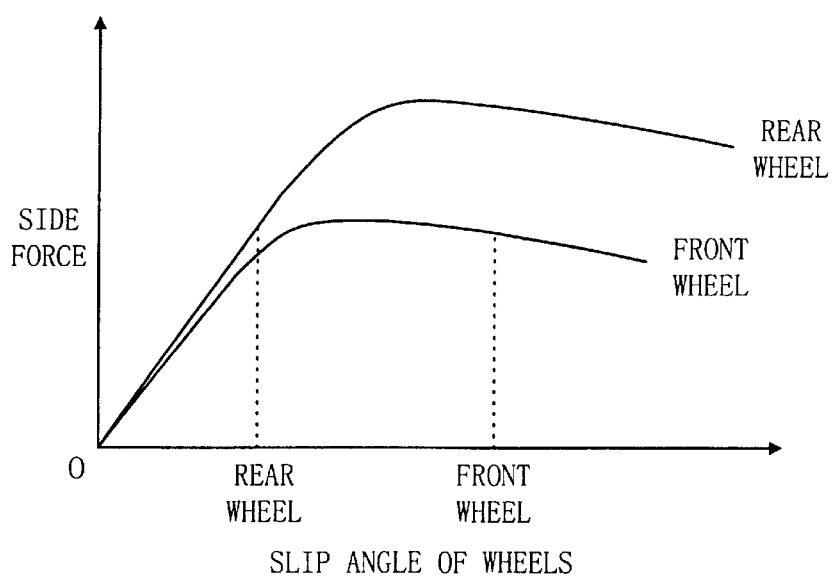
FIG. 13 is a graph showing the side force generally available by the front and rear wheels of an ordinary four wheel vehicle in relation to the slip angle of the wheels.

FIGS. 8A and 8B show a case where a vehicle 102c makes a right turn with the rear wheels 100RL and 100RR being steered in the direction opposite to that of the front wheels 100FL and 100FR, with no turn assist yaw moment being given. In this case, as shown in FIG. 8A, in an early stage of the turn, the slip angle βr of the rear wheels is opposite to the slip angle βf of the front wheels, so that the side force Fr generated by the rear wheels generates a yaw moment Mys around the center of gravity 104 in the direction of assisting the turn of the vehicle. Although in this case the vehicle can make a relatively sharp turn as shown by trace C in FIG. 11 by being assisted by the yaw moment Mys, since the centripetal side force available at the rear wheels is small or even negative, the vehicle is less firmly retained from the road surface against the centrifugal force acting at the vehicle, particularly less at the rear wheels, apt to rotate around the center of gravity 104 in the clockwise direction, the vehicle is apt to lose the turn stability, so as to cause a spin in a later stage of the turn as shown in FIG. 11. Further, it will be noted that the trace C is undesirably biased to the outside of the turn in the early stage of the turn.

Figure 9A:
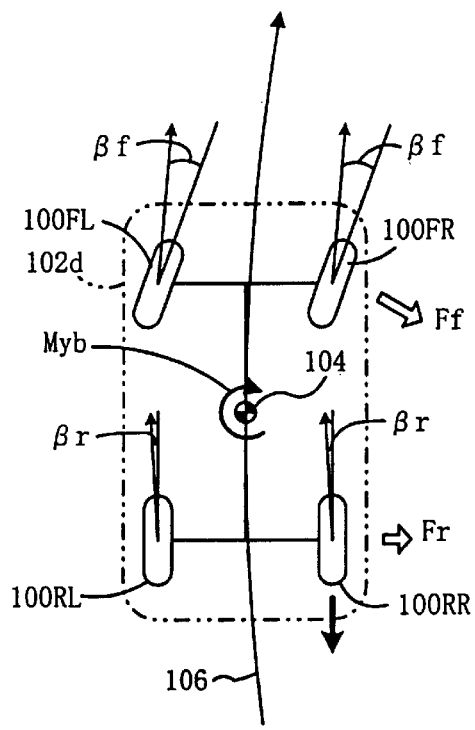
FIGS. 9A and 9B are diagrammatical plan views showing a front wheel steered vehicle in an early and a later stage of a right turn, respectively, with a brake/traction control executed to assist the turn of the vehicle.
Figure 9B:
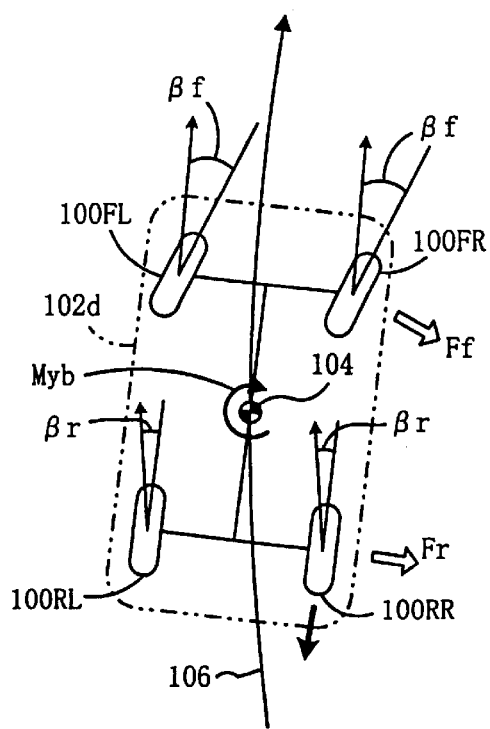

FIGS. 9A and 9B show a case where a vehicle 102d is given a turn assist moment Myb around the center of gravity 104 by the brake/traction control system, with no steering control of the rear wheels. FIGS. 9A and 9B show the behavior of the vehicle in an early stage and a later stage of the turn, respectively. In this case, the turn behavior of the vehicle will be similar to that of the case of FIGS. 8A and 8B, except that, since there is some delay for the turn assist yaw moment Myb being generated to be effective in response to the detection of a turning state of the vehicle, the running trace of the vehicle will be such as shown by trace D in FIG. 11.

Figure 10A:
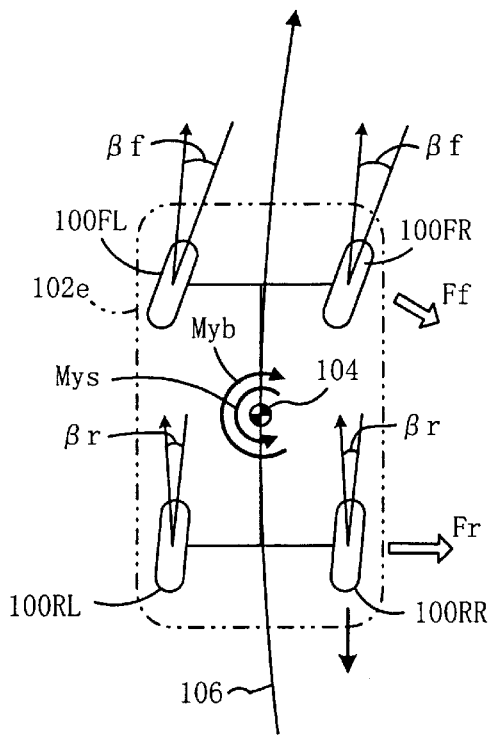
FIGS. 10A and 10B are diagrammatical plan views showing a four wheel steered vehicle in an early and a later stage of a right turn, respectively, with the rear wheels steering control in the same direction as the front wheels, and with a brake/traction control for assisting the turn of the vehicle, according to the present invention.
Figure 10B:
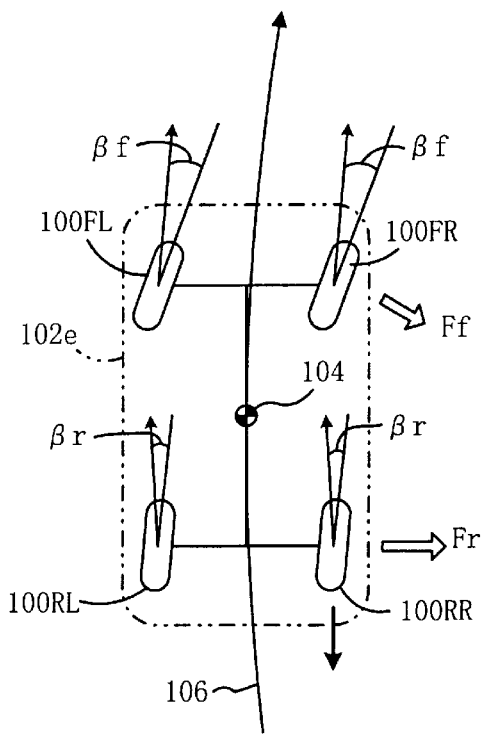

FIGS. 10A and 10B show a case where a vehicle 102e makes a right turn with a turn assist moment Myb being given around the center of gravity 104 by the brake/traction control, together with the rear wheels 100RL and 100RR being steered in the same direction as the front wheels 100FL and 100FR, so as to increase the centripetal side force Fr at the rear wheels, according to the present invention. FIGS. 10A and 10B show the turn behavior of the vehicle in an early stage and a later stage of the turn, respectively. In this case, although the relatively large side force Fr at the rear wheels generates a corresponding amount of anti-turn yaw moment Mys around the center of gravity 104, this anti-turn yaw moment is compensated for or canceled by the turn assist yaw moment Myb by the brake/traction control being correspondingly increased, while retaining the centripetal side force Fr available at the rear wheels to be effective for suppressing the driftout of the vehicle. By properly designing the brake/traction control and the steering control of the rear wheels in the same direction as the front wheels, the trace of the vehicle will be adjusted to a desirable trace such as trace E in FIG. 11.

Although the present invention has been shown and described in detail with respect to a particular embodiment thereof, it will be apparent for those skilled in the art that various modifications are possible within the scope of the present invention.

What is claimed is:

1. A driftout control device of a four wheel steered vehicle having a pair of front and a pair of rear wheels, a brake/traction system for selectively applying a braking and/or a traction force to each of the four wheels, and a steering system for selectively steering the pair of front and the pair of rear wheels separately, the driftout control device comprising a first control means for controlling the brake/traction system so as to selectively generate a turn assist yaw moment in the vehicle, the turn assist yaw moment generated based upon modifying an amount thereof according to an increase of an angle of steering of the rear wheels in a same steering direction as the front wheels, and a second control means for controlling the steering system so as to selectively steer the pair of rear wheels in the same steering direction as a steering of the pair of front wheels for a turn running of the vehicle when the first control means controls the brake/traction system for generation of the turn assist yaw moment.

2. A driftout control device according to claim 1, wherein the first control means controls the brake/traction system so as to generate the turn assist yaw moment substantially as a sum of a first amount and a second amount, the second amount being substantially proportional to angle of steering of the rear wheels in the same direction as the steering of the front wheels.

3. A driftout control device according to claim 2, wherein the first control means controls the brake/traction system so as to generate the turn assist yaw moment such that the first amount thereof is a sum of a third amount substantially proportional to slip angle of the rear wheels, a fourth amount substantially proportional to a function of yaw rate of the vehicle and a fifth amount substantially proportional to differential of the slip angle of the rear wheels in the same direction as the steering of the front wheels, the function of yaw rate of the vehicle being substantially proportional to the yaw rate.

4. A driftout control device according to claim 3, wherein the first control means controls the brake/traction system so as to generate the turn assist yaw moment such that the first amount is increased substantially proportionally according to increase of driftout of the vehicle when the driftout increases beyond a predetermined value.

5. A driftout control device according to claim 2, wherein the first control means controls the brake/traction system so as to generate the turn assist yaw moment by canceling the second amount, while the second control means cancels to control the steering system, when the steering system is not normally operating.

6. A driftout control device according to claim 1, wherein the second control means controls the steering system so as to steer the rear wheels in the same direction as the steering of the front wheels with an additional increase to steering the rear wheels, the additional increase being substantially proportional to an actual turn assist yaw moment generated by the brake/traction system in the vehicle.

7. A driftout control device according to claim 6, wherein the second control means controls the steering system so as to steer the rear wheels such that the additional increase is made zero when the direction of the actual turn assist yaw moment is opposite to that of the yaw rate of the vehicle.

8. A driftout control device according to claim 6, wherein the first control means cancels to control the brake/traction system, while the second control means controls the steering system so as to steer the rear wheels in the same direction as the steering of the front wheels by canceling the additional increase, when the brake/traction system is not normally operating.

* * * * *